(No Model.)
H. B. COBB.
MACHINE FOR LAYING ELECTRIC CONDUCTING WIRES.
No. 293,632. Patented Feb. 19, 1884.
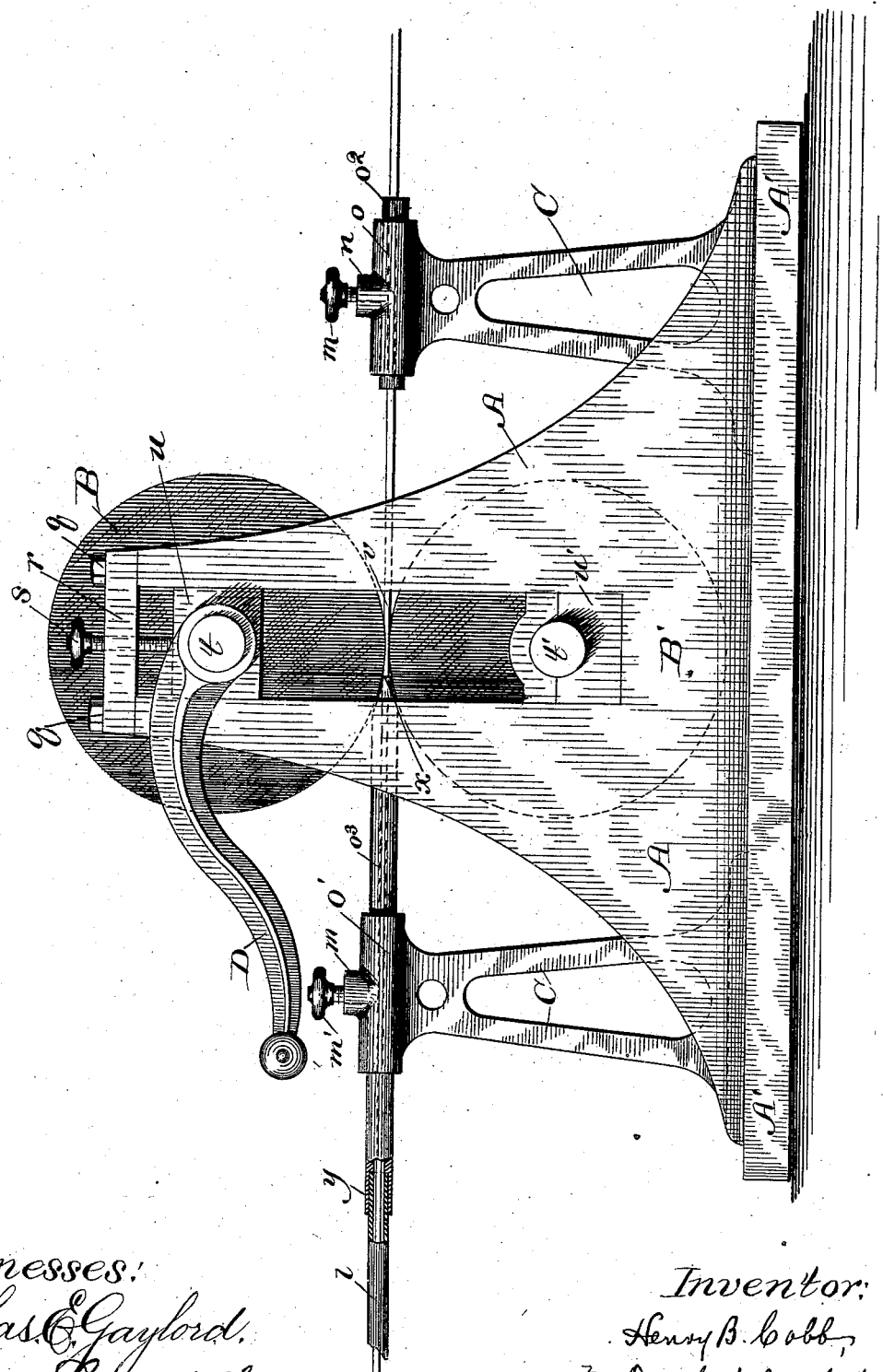
Witnesses:
Chas. E. Gaylord.
Douglas Dyrenforth
Inventor:
Henry B. Cobb,
By Dyrenforth & Dyrenforth,
Attys.

UNITED STATES PATENT OFFICE.

HENRY B. COBB, OF WILMINGTON, DELAWARE.

MACHINE FOR LAYING ELECTRIC CONDUCTING-WIRES.

SPECIFICATION forming part of Letters Patent No. 293,632, dated February 19, 1884.

Application filed November 24, 1883. (No model.)

*To all whom it may concern:*

Be it known that I, HENRY B. COBB, a citizen of the United States, residing at Wilmington, in the county of New Castle and State of Delaware, have invented a certain new and Improved Machine for Laying the Electric Conducting-Wires in Subterranean Systems; and I hereby declare the following to be a full, clear, and exact description of the same.

It is the purpose of my invention to render possible without difficulty the laying of the line-wire in all subterranean electric systems in which tubing is used; and it is the particular purpose of my invention to provide a machine to be used in laying the line-wires in the system of laying subterranean lines of electric wires for which Letters Patent Nos. 288,310 and 288,311 were granted to me November 13, 1883.

My invention consists in mechanism for pushing wire to any desired length through a tube formed to receive it, by means of which mechanism kinks shall be removed from the wire and buckling of the latter be avoided.

The drawing represents a side elevation of my improved machine.

A is one side of the frame of the machine, which rests on the base A', and is provided with the vertical slot $v$, to admit the bearings $u$ and $u'$ for the journals $t$ and $t'$ of the rollers B and B', and to permit a vertical sliding movement of the bearing $u$, which carries the roller B, through the medium of the journal $t$, all as hereinafter fully described. The part A is strengthened, to prevent widening of the slot $v$, by means of the cross-piece $r$, secured at each side of the slot by the bolts and nuts $q$, and the cross-piece serves at the same time as a support for the adjusting-screw $s$, the purpose of which will be described later on.

It should be here stated that the side view represented in the drawing shows only one each of the parts A, $v$, $u$ and $u'$, $t$ and $t'$, one adjusting-screw $s$, and one cross-piece $r$, secured by bolts and nuts $q$; but it will readily be understood that parts exactly identical with these necessarily exist on the opposite side.

C and C' are standards of equal height, suitably secured to the base A' of the frame, one near each end thereof, between the parts A. Each standard is provided with a tubular head, one, $o$, to receive a die, $o^2$, the other, $o'$, to receive the tube $o^3$, which is made tapering toward one end, as shown at $x$. The heads $o$ $o'$ are each provided with a hollow internally-screw-threaded T-joint, $n$, one to receive a set-screw, $m$, and the other a set-screw, $m'$.

The purpose of the machine, as hereinbefore stated, is to provide a means for readily laying the electric conducting-wires in all underground systems in which tubing is used; but as it is intended to form an important adjunct in laying the wires in the system invented and patented by me, as aforesaid, I will describe its operation in connection therewith, merely stating that the method of its operation is the same, and its construction substantially, if not exactly, the same for all similar systems.

Reference to my Patent No. 288,311 will disclose that man-holes are provided along the line or lines of conduit containing metallic tubes, which inclose insulating-tubes, the latter to receive the wire. A machine may be operated at each of any desired number of these man-holes, the operation of the machine being as follows: Wire of the required size and length to be laid is unwound from a reel, one end of the wire being inserted through the die $o^2$, firmly held by a set-screw, $m$, in the tubular head $o$, and having a longitudinal opening through it, just sufficient in diameter to admit the wire to be passed. The end of the wire is then brought between the rollers B and B', the former being adjustable by means of the bearing $u$, which is confined in the slot by guides formed by the edges of the standards, which edges fit within lateral grooves provided in the bearing, whereby a vertical reciprocating movement thereof is permitted. The roller B is then firmly pressed by means of the set-screw $s$ upon the wire, which rests upon the periphery of the roller B'. A tube, $o^3$, is sustained toward one end within the head $o'$, similar to the head $o$, and securely held by means of the set-screw $m'$. The tube $o^3$ is made, preferably, tapering toward its opposite end to a degree sufficient to leave an opening just large enough to admit the end of the wire. The taper at the end of the tube $o^3$ is slightly concave, to conform to the periphery of the rollers, in order that the tube may enter between the rollers sufficiently far to meet or nearly meet the end of the wire, whereby but little, if any, space is left for the wire to pass through before entering the opening in the tapered end of the tube $o^3$, so that buckling of the wire shall be avoided. Everything being now in readiness, the crank D, connected at one end with the journal $t$, is turned, and the wire, by its frictional contact with the rollers, is pushed through the tube $o^3$, and thence into and through the insulating-tube $l$, of which one end is inserted into the tube $o^3$, as shown at $y$. When passed from the starting-place through to the next succeeding man-hole, the wire may be adjusted to a machine at that man-hole, the two now in operation being worked simultaneously until a third man-hole is reached by the wire, when the latter is connected with still another machine, three such now being worked together, and so on until the desired length of wire has been laid. Instead of being operated simultaneously, however, the last machine receiving the wire may be operated alone to pull the wire from one or more preceding machines, and to push it toward the machine in the next succeeding man-hole. The die $o$ serves the twofold purpose of affording a guide for the wire and straightening it.

For wire of different sizes, dies having openings to correspond may be provided, and adjusted and removed without difficulty by means of the set-screw $m$. For each change of die, however, a similar change of tube $o^3$ becomes necessary, and different sizes thereof are removable from and adjustable within the head $o'$ by means of the set-screw $m'$, as in the case of the die $o$, just described. For each increase in the size of the wire used, the set-screw is of course loosened, to permit the wire to be received between the rollers by raising the roller B to the desired height. If desired, the tapering tube $o^3$ and the mechanism sustaining it may be omitted, and the insulating-tube be adjusted in a position as close as practicable to the friction-rollers, to receive the wire as it emerges from between them. The omission will not produce undesirable results, though it is preferred to use the tapering tube, especially for laying fine wire, since thereby the smallest possible space exists between the end of the tube and the point of emergence of the wire from between the friction-wheels, and of course the smaller this space the less the likelihood of buckling of the wire.

The bearing $u'$, for the journal $t'$ of the wheel B', is preferably formed in two pieces, as shown, though the lower part could be a part of the frame, if desired, instead of being a separate piece adjusted within the slot, when the slot would of course be proportionately reduced in length. The bearing for the journal $t$ is preferably formed of one piece, provided with an opening to receive the journal.

Wire, whether insulated or not, may be laid within tubes in the manner above described in very great lengths. Since buckling is impossible, stoppage of the progress of the wire within the tube can only arise owing to frictional contact of a very great length of the wire with the inside of the tube.

What I claim as new, and desire to secure by Letters Patent, is—

1. In a machine for pushing an electric conducting-wire through a tube formed to receive it, the combination, with the frame A A', adjustable rollers B B', and mechanism for adjusting the said rollers relatively to each other, of the upright C, die $o^2$, supported by the said upright, and mechanism for detachably securing the said die to the said upright, substantially as described.

2. In a machine for pushing an electric conducting-wire through a tube formed to receive it, the combination, with the frame A A', adjustable rollers B B', and mechanism for adjusting the said rollers relatively to each other, of the upright C', the tube $o^3$, supported by the said upright, and mechanism for detachably securing the tube $o^3$ in position to the said upright, substantially as described.

3. In a machine for pushing an electric conducting-wire through a tube, the combination, with the frame A A', adjustable rollers B B', mechanism for adjusting the said rollers relatively to each other, and upright C', having tube $o^3$ adjustably secured thereon, of the upright C, die $o^2$, and mechanism for detachably securing the said die to the said upright, substantially as described.

HENRY B. COBB.

In presence of—
C. C. LINTHICUM,
DOUGLAS DYRENFORTH.